(12) United States Patent
Van Den Berg et al.

(10) Patent No.: US 12,268,125 B2
(45) Date of Patent: Apr. 8, 2025

(54) AGRICULTURAL METHOD AND SYSTEM FOR PERFORMING THE METHOD

(71) Applicant: LELY PATENT N.V., Maassluis (NL)

(72) Inventors: Karel Van Den Berg, Maassluis (NL); Korstiaan Cornelis Blokland, Maassluis (NL); Renatus Ignatius Josephus Fransen, Maassluis (NL); Carlo Van Sonsbeek, Maassluis (NL); Ingrid Elisabeth Maria Den Uijl, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 245 days.

(21) Appl. No.: 18/012,085

(22) PCT Filed: Jul. 15, 2021

(86) PCT No.: PCT/IB2021/056391
§ 371 (c)(1),
(2) Date: Dec. 21, 2022

(87) PCT Pub. No.: WO2022/013804
PCT Pub. Date: Jan. 20, 2022

(65) Prior Publication Data
US 2023/0232741 A1     Jul. 27, 2023

(30) Foreign Application Priority Data

Jul. 16, 2020 (NL) ........................ 2026073
Oct. 6, 2020 (NL) ........................ 1043808

(51) Int. Cl.
*A01D 41/12* (2006.01)
*A01C 23/04* (2006.01)
(Continued)

(52) U.S. Cl.
CPC ........ *A01D 41/1278* (2013.01); *A01C 23/047* (2013.01); *A01D 41/1277* (2013.01);
(Continued)

(58) Field of Classification Search
CPC ............ A01D 41/1278; A01D 41/1277; A01D 41/133; A01D 43/063; A01D 34/008;
(Continued)

(56) References Cited

U.S. PATENT DOCUMENTS

| 5,557,859 | A | 9/1996 | Baron |
| 10,188,024 | B2 * | 1/2019 | Rusciolelli ............. A01B 33/16 |
| 2017/0202177 | A1 | 7/2017 | Loosveld |

FOREIGN PATENT DOCUMENTS

| EP | 3 145 300 A1 | 3/2017 |
| GB | 905116 | 9/1962 |
| WO | WO-2015178764 A1 * | 11/2015 ............. A01K 5/001 |

OTHER PUBLICATIONS

International Search Report, issued in PCT/IB2021/056391, dated Oct. 11, 2021.
(Continued)

*Primary Examiner* — Michael V Kerrigan
(74) *Attorney, Agent, or Firm* — Birch, Stewart, Kolasch & Birch, LLP

(57) ABSTRACT

A method, using an autonomous, unmanned device and a control device, includes the steps of automatically harvesting feed crop in a part of a crop field by means of the autonomous, unmanned device; automatically loading the harvested feed crop directly into a storage space provided on the autonomous, unmanned device without said harvested feed crop contacting the soil; choosing a destination location from a feeding location and a stationary crop processing location; automatically transporting the harvested feed crop from the crop field to the chosen destination location by means of the autonomous, unmanned device; and automati-
(Continued)

cally unloading harvested feed from the storage space of the autonomous, unmanned device at the chosen destination location.

20 Claims, 5 Drawing Sheets

(51) Int. Cl.
    *A01D 41/127*     (2006.01)
    *A01D 41/133*     (2006.01)
    *A01F 15/07*     (2006.01)
    *G05D 1/00*     (2006.01)

(52) U.S. Cl.
    CPC .......... *A01D 41/133* (2013.01); *A01F 15/071* (2013.01); *G05D 1/0212* (2013.01)

(58) Field of Classification Search
    CPC .... A01C 23/047; A01F 15/071; A01F 25/045; A01F 25/08; G05D 1/0212; Y02A 40/28; A01B 69/008; A01K 5/004; A01K 5/02; A01K 5/0266; A01K 5/0275
    See application file for complete search history.

(56) References Cited

OTHER PUBLICATIONS

Pottinger International News, "Mähladen bringt gute Milchleistung bei geringen Produktionskosten", May 25, 2017, Retrieved from the Internet: URL: https://www.poettinger.at/de_in/Newsroom/Artikel/9691/maehladen-bringt-gute-milchleistung-bei-geringen-produktionskosten.

Roberts, "Zero-grazing and cutting silage with the same wagon in Co. Westmeath", Sep. 30, 2018, Retrieved from the Internet: URL: https://www.agriland.ie/farming-news/zero-grazing-and-cutting-silage-with-the-same-wagon-in-co-westmeath/.

Written Opinion of the International Searching Authority, issued in PCT/IB2021/056391, dated Oct. 11, 2021.

* cited by examiner

AGRICULTURAL METHOD AND SYSTEM FOR PERFORMING THE METHOD

BACKGROUND OF THE INVENTION

(1) Field of the Invention

The present invention relates to an agricultural method.

(2) Description of Related Art

Such methods are widely known. Prior art document U.S. Pat. No. 5,557,859 discloses a method of continuously cutting, solar drying, baling and accumulating crop directly in the field in a single pass operation within a contained, transportable chamber. Solar drying is not very efficient. All the crop processing operations are performed in the field, which is complex and costly. Other known methods all have drawbacks too. Many of them require manual labour or at least the use of a machine operator and/or a tractor driver. Others are restricted to harvesting and processing crop locally in the crop field. Still others involve temporarily depositing the harvested crop on the soil, which leads to pollution of the crop. There is a need for an improved, highly automated and highly universal method.

BRIEF SUMMARY OF THE INVENTION

It is an object of the present invention to provide an improved agricultural method.

The invention achieves the object at least in part by means of a method according to claim 1, in particular an agricultural method, using an autonomous, unmanned device and a control device, comprising the following steps, which are performed repeatedly:
  a) automatically harvesting feed crop in a part of a crop field by means of the autonomous, unmanned device;
  b) automatically loading the harvested feed crop directly into a storage space provided on the autonomous, unmanned device without said harvested feed crop contacting the soil;
  c) choosing a destination location from a feeding location and a stationary crop processing location;
  d) automatically transporting the harvested feed crop from the crop field to the chosen destination location by means of the autonomous, unmanned device;
  e) automatically unloading harvested feed from the storage space of the autonomous, unmanned device at the chosen destination location.

In this way, an efficient, completely automated method is realized wherein harvested feed crop is delivered at a destination location, which is either a feeding location where the crop is freshly fed to animals, or a stationary crop processing location, where the crop is further processed. Being able to choose the destination location in accordance with the circumstances is highly advantageous. The invention is based upon the insight that in an autonomous crop harvesting and transporting system it is not always desirable to deliver the crop directly to a feeding station for feeding animals. Under certain circumstances it is preferable to deliver the crop to a processing station where it can be further processed (e.g. for preservation, refining or composting).

The invention also relates to a system for performing the method, in particular, a system using a control device, an autonomous, unmanned device provided with automatic driving means comprising wheels, navigation means, automatic feed harvesting means, automatic feed loading means, a feed storage space, and automatic feed unloading means, an automatic energy charging station for the autonomous, unmanned device, a feeding location and a stationary crop processing location with crop processing means. An efficient, multi-purpose, highly flexible and completely automatic system is thus realized.

Suitable and advantageous embodiments are described in the dependent claims, as well as in the description below.

According to an embodiment, in case the chosen destination location is a crop processing location, the extra step of automatically dosing the feed in a container of a feed mixer and preferably with an additional cutting action is performed. Often depending on the location of the field, the harvested crop can differ in structure, humidity and content. By mixing the crop before feeding, the crop can be mixed to a homogenous amount of feed. In addition, for even getting a more homogeneous amount, the crop can be cut into smaller pieces. Sometimes certain animals like young animals need smaller pieces of crop. Also, the smaller pieces of feed obtained by the cutting action promotes better mixing.

According to another embodiment, the extra steps of automatically adding other types of feed in the container and mixing the types of feed is performed. In this way a feed according a specific recipe can be made, better serving the needs of the animals. When dosing a type feed above another type of feed in the feeding alley, the animals can select a specific type. Especially grass can easily be selected. The possibility to select feed (in most cases select fresh grass) can lead to unrest in a herd when they recognize that fresh grass is dropped above other types of feed in the feeding alley. When certain animals select too much of a specific type of feed, they even can get sick. Therefore mixing different types feed before feeding will lead to less stress and healthier animals.

According to a preferable embodiment, in case the chosen destination location is a crop processing location, the extra step of automatically crushing the harvested feed at the crop processing location is performed. Crushing is advantageously performed as a first step in order to preserve the harvested crop.

In a further preferable embodiment, in case the chosen destination location is a crop processing location, the extra step of automatically drying the harvested feed at the crop processing location is performed. Drying is a highly effective step in preserving the harvested crop.

Advantageously, after the drying step the additional step of compressing and wrapping the harvested feed is performed. In this way, the preservation of the harvested crop is efficiently achieved.

In yet another embodiment, during the drying step the dry matter content of the crop is being determined and monitored in order to define the optimal transition from the drying step to the compressing and wrapping step. The dry matter content may e.g. be measured or estimated. Its value is then monitored (e.g. compared to an optimum value) and used to determine the right moment to stop the drying step and to start the following step in which the feed is being compressed and wrapped. In this way, the preserved feed has the optimal dry matter content.

Preferably, after the harvesting step the additional step of automatically fertilizing said part of the crop field using the autonomous, unmanned device is performed. This ensures a good soil regeneration. Performing this step right after the harvesting step has the advantage that the soil is readily accessible. Besides, the soil and/or the crop is not compressed or pressed down, ensuring an excellent fertilization of the soil.

In an embodiment, in step c) the choosing is performed in dependence on a determined feed demand at the feeding location. In case of a high feed demand, it is advantageous to deliver the harvested feed crop directly at the feeding location. If the feed demand is low, it is preferable to deliver the feed crop to the crop processing station, where it can be preserved or otherwise processed. Thus, an efficient method is realised.

In a further embodiment, in step c) the choosing is performed in dependence on a determined quantity of remaining crop in the crop field. The quantity can be measured or estimated. In case there is still a lot of crop in the crop field, it is advisable to deliver feed crop to the crop processing location. This also enhances the efficiency of the method.

In yet another embodiment, in step c) the choosing is performed in dependence on a determined quality of the harvested feed in the storage space. Low quality feed is less suitable to be fed to animals at the feeding location. Again, the efficiency of the method is enhanced in this way.

In yet a further embodiment, in case the chosen destination location is a crop processing location, the additional step of refining the harvested feed at the crop processing location is performed. Instead of preserving the harvested feed crop at the crop processing location, there is an alternative way of processing it: refining the crop. In a manner known as such, a juice can be pressed out of the crop, which can be separated into different fractions in order to extract, for example, protein. This constitutes a highly useful alternative way of processing the freshly harvested feed crop.

In an embodiment of the system according to the invention, the crop processing means comprise a drying station provided with a housing having an air inlet and an air outlet, ventilator means, and a crop drying surface provided with weighing means. This is a straightforward, yet highly efficient implementation.

Preferably, furthermore means are provided for preheating air at or near the air inlet. Thus, a good drying action is achieved.

In a further embodiment, the housing surface and the surface at and/or near the air inlet are of a dark colour in order to achieve an optimal heat conversion from the sunlight. This further enhances the efficiency of the system.

In yet another embodiment, furthermore means are provided for determining the relative air humidity at or near the air inlet and/or at or near the air outlet. This is advantageous in that the relative air humidity is a significant parameter in the drying process.

In a highly advantageous embodiment, means are provided for controlling the ventilator means in dependence on the determined relative air humidity at or near the air inlet and at or near the air outlet. For example, the rotation speed and/or the runtime may be optimised. In this way, the efficiency of the system is further improved.

BRIEF DESCRIPTION OF THE DRAWINGS

The invention will now be further explained with reference to the following Figures.

DETAILED DESCRIPTION OF THE INVENTION

Figure 1:
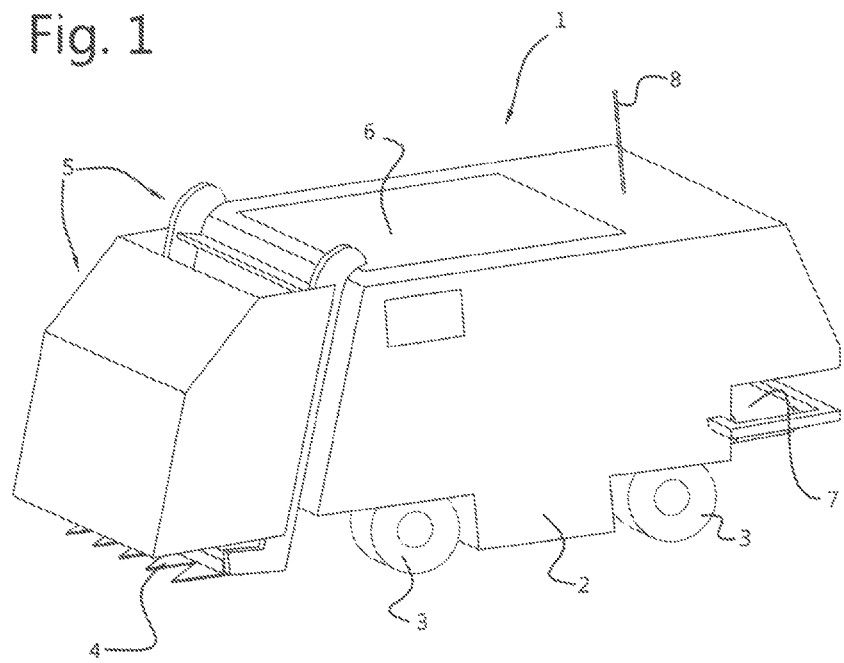
FIG. 1 shows an autonomous, unmanned device for use in the invention.

In FIG. 1 an embodiment of an autonomous, unmanned device 1 according to the invention is depicted.

The autonomous, unmanned device 1 is a self-propelled vehicle with a body 2 and wheels 3. The front side (in the drawing left) is provided with automatic harvesting means 4, here shown in the form of an automatic mowing device 4. Furthermore, there are automatic loading means 5 with a cover for conveying the harvested crop into a storage space 6 inside the body 2. These automatic loading means can be a known conveyor belt with cleats, arranged in a protective cover. At the rear side (in the drawing right) there are provided means 7 for automatically unloading and dosing crop at the destination location, here shown as a side discharge 7. An antenna 8 on top of the body 2 is provided for communication purposes.

Not shown are drive means for the autonomous, unmanned device 1 and a computer (or other control means) with the aid of which the autonomous, unmanned device 1 is controlled and operated. This computer comprises i.a. a processor and navigation means. It can be included in the autonomous, unmanned device 1, but it can also be located elsewhere and communicate with the vehicle 1 via antenna 8.

Also not shown is an automatic energy charging station for the autonomous, unmanned device 1, where it can electrically charge its battery or batteries with known charging means and connector means. Alternatively, it is also possible to use a combustion engine or any other suitable means for driving the device 1, instead of a rechargeable battery.

Figure 2:
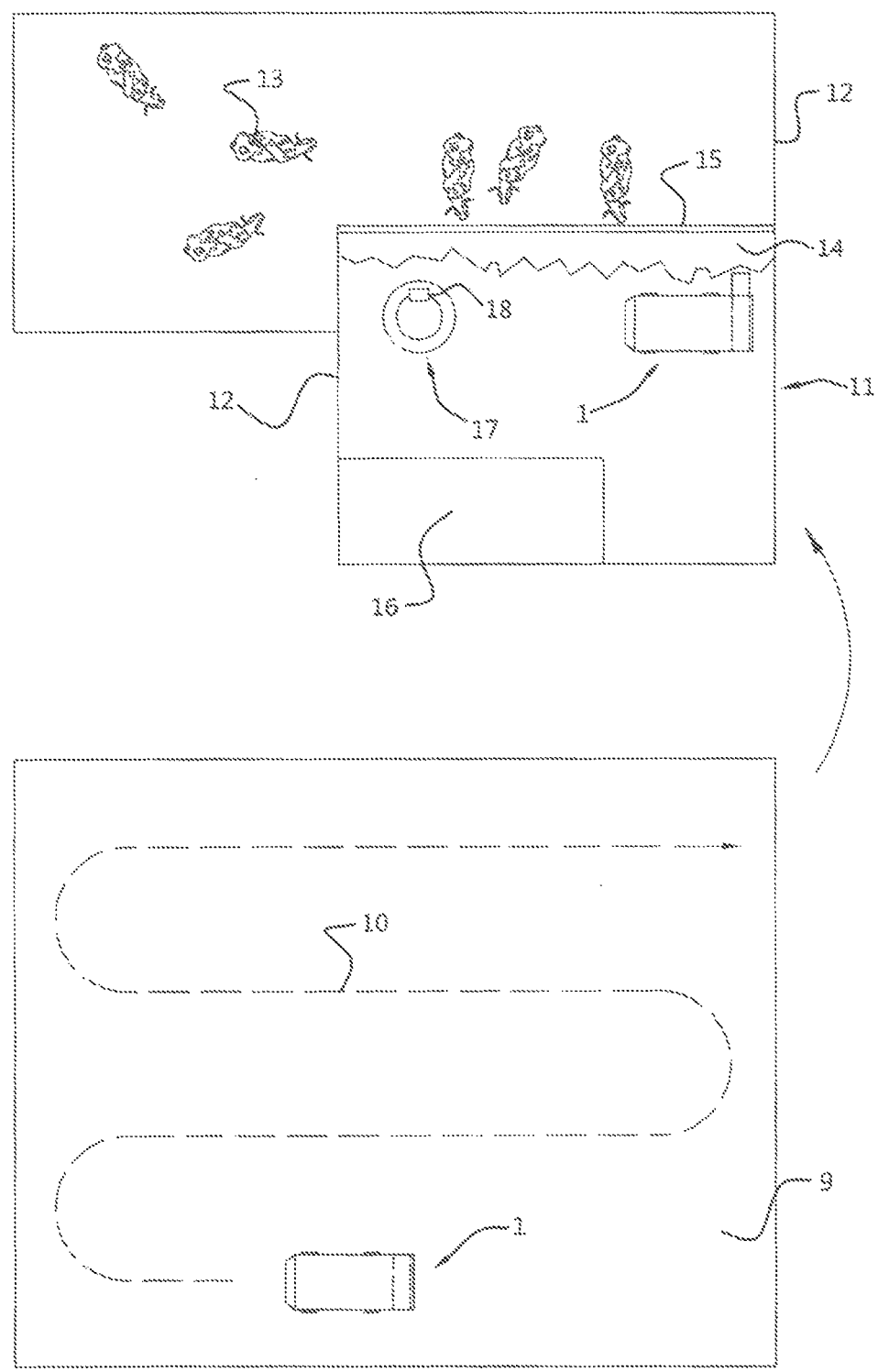
FIG. 2 shows a system according to the invention.

In FIG. 2 a system according to the invention is shown.

The autonomous, unmanned device 1 moves over a crop field 9, for example a grass field, following a path 10, under the control of the computer. When the autonomous, unmanned device 1 has finished mowing and loading the grass, it moves to the destination location 11. In the embodiment shown, this destination location 11 is inside a barn or stable 12 in which cows 13 can move freely. In FIG. 2, the autonomous, unmanned device 1 is delivering crop feed to the cows 13 in the barn 12. Feed 14 is provided to the animals 13 at a feed fence 15.

This feed fence 15, or the space near this feed fence 15 in the stable 12, constitutes a feeding location. Also provided in the barn 12 is a stationary crop processing location 16, which will be described further below. Of course, the feeding location 15 and the stationary crop processing location 16 may also be located further apart from each other, possibly at the same farm, or even in completely different locations.

In accordance with the invention, feed crop is automatically harvested in a part of crop field 9 by means of the autonomous, unmanned device 1. Then, the harvested feed crop is automatically loaded directly into storage space 6 provided on the autonomous, unmanned device 1 without said harvested feed crop contacting the soil. Next, the destination location 11 is chosen: it is either the feeding location 15 or the stationary crop processing location 16. The harvested feed crop is then automatically transported from the crop field 9 to the chosen destination location 11 by means of the autonomous, unmanned device 1, where it is automatically unloaded from the storage space 6 of the autonomous, unmanned device 1.

If the destination location 11 is the feeding station, the autonomous, unmanned device 1 moves along the feed fence 15 while unloading and dosing the feed 14 to the cows 13 via the side discharge 7. Also shown is an autonomous, unmanned feed pusher device 17 provided with a feed amount sensor, for example a feed height sensor 18, such as a laser. Such autonomous, unmanned feed pusher devices are known as such. They are used to push the feed 14, if necessary, back within reach of the cows 13 at the feed fence 15. The feed pusher 17 can communicate with the computer and send feed height measurements, in order to establish a future feed demand at the feeding location 15.

Alternatively, the system can function well without such a separate autonomous, unmanned feed pusher device 17, in case the autonomous, unmanned device 1 itself is provided with feed pusher means (not shown). Also, the autonomous, unmanned device 1 can be provided with a feed amount sensor (not shown), such as a feed height sensor, for example a laser.

After supplying the animals 13 in the barn 12 with feed 14, or after visiting the stationary crop processing location 16, the autonomous, unmanned device 1 returns to the crop field 9 for a next harvesting run. A continuous supply of fresh grass 14 to the destination location 11 in the barn 12 is thus established.

The feed amount sensor 18 can communicate with the computer, so that the computer can take the measurements into account when determining the feed demand at the feeding location 15. The computer can also have data available regarding the size and/or composition of the group of animals 13 to be fed. The term "composition of the group" is meant here to encompass age distribution, breed of the animals 13, lactation stage groups, etcetera. The age, breed and/or lactation stage of the animals 13 also influence(s) the feeding behaviour. These data can be taken into account by the computer for his calculations, just like weather or historical data. For example, the computer can have data on the influence of extreme temperatures on the feeding habits of the animals 13, and/or data on the feeding habits of a certain animal or breed of animals over a certain period (e.g. 24 hours, in different seasons or lactation stages). The more data the computer has available, the more precise it can predict the feed demand.

The amount of feed crop 14 collected in the storage space 6 is monitored. Monitoring means for the amount of feed crop 14 collected in the storage space 6 can be weighing means such as a weighing floor in the storage space 6 or feed height sensors (not shown) provided at, in or near the storage space 6.

The surface of the crop field 9 already harvested is monitored by means of the computer with the help of the navigation means and after visiting the destination location 11 the autonomous, unmanned device 1 is automatically returned to the crop field 9 to a starting location in dependence on the surface of the crop field 9 already harvested, as registered in the computer with the help of the navigation means. The autonomous device 1 is then ready for a next harvesting run. This is being performed repeatedly, so that a constantly repeated supply of fresh feed crop at the destination location 11 is guaranteed. The monitoring can be done in a simple way, e.g. by registering the begin and end point of the harvesting trajectory, but preferably use is made of the navigation means (known as such). The end point of the last harvesting run can be taken as the starting point for the next run.

It is noted that in FIG. 2 the path 10 for the autonomous, unmanned device 1 is only a schematic illustration. Normally, the device 1 will have to move up and down the field 9 quite a number of times. As soon as the computer has decided that the device 1 should go to the destination location 11, having taken into account the expected feed demand (as determined with e.g. the feed height sensor 18), the collected amount of feed in the storage space 6 (as determined e.g. with the weighing floor) and the expected travel path and time from the current position of the device 1 to the destination location 11 (as determined with the navigation means), the device leaves the field 9 along the optimal path 10 calculated by the computer and moves towards the barn 12. This is not exactly illustrated in FIG. 2. The device might leave the field 9 somewhere on the side, for example, if that is a shorter way.

After the harvesting step the additional step of automatically fertilizing said part of the crop field 9 using the autonomous, unmanned device 1 can be performed. This ensures a good soil regeneration. Performing this step right after the harvesting step has the advantage that the soil is readily accessible. Besides, the soil and/or the crop is not compressed or pressed down, ensuring an excellent fertilization of the soil.

To this end, a fertilizer mix tank for containing a fertilizer mix (e.g. fertilizer diluted with water) may additionally be provided on the device 1, with a volume of e.g. 100 liters. On device 1, between the harvesting means 4 and the wheels 3 there may be provided fertilizer mix dosing means (connected to the fertilizer mix tank), e.g. comprising a row of dosing nozzles on a dosing bar (known as such, not shown). The dosing nozzles are provided, seen in the direction of travel of the autonomous, unmanned device 1, behind the harvesting means 4 and before the wheels 3. This is a technically simple, yet beneficial solution. The soil and/or the crop is not compressed or pressed down by the wheels 3, ensuring a better fertilization of the soil. A fertilizer mix filling station (not shown) for (re)filling the fertilizer mix tank can be arranged e.g. at the energy charging station for the device 1, preferably at or near the destination location 11.

In accordance with an embodiment of the invention, in step c) of the claimed method the choosing between the feeding location 15 and the stationary crop processing location 16 is performed in dependence on a determined feed demand at the feeding location 15. In case of a high feed demand, it is advantageous to deliver the harvested feed crop directly at the feeding location 15. If the feed demand is low, it is preferable to deliver the feed crop to the crop processing station 16, where it can be preserved or otherwise processed, as will be described below. The feed demand can be measured, estimated, calculated or predicted, as already described above.

In step c) of the method the choosing can also (alternatively or additionally) be performed in dependence on a determined quantity of remaining crop in the crop field 9. The quantity can be measured or estimated. In case there is still a lot of crop in the crop field 9, it is advisable to deliver feed crop to the crop processing location 16. This also enhances the efficiency of the method.

In step c) of the method the choosing can also (alternatively or additionally) be performed in dependence on a determined quality of the harvested feed in the storage space 6. Low quality feed is less suitable to be fed to animals at the feeding location 15. It is preferable to process this feed at the stationary crop processing location 16. The efficiency of the method is even further enhanced in this way.

Figure 3:
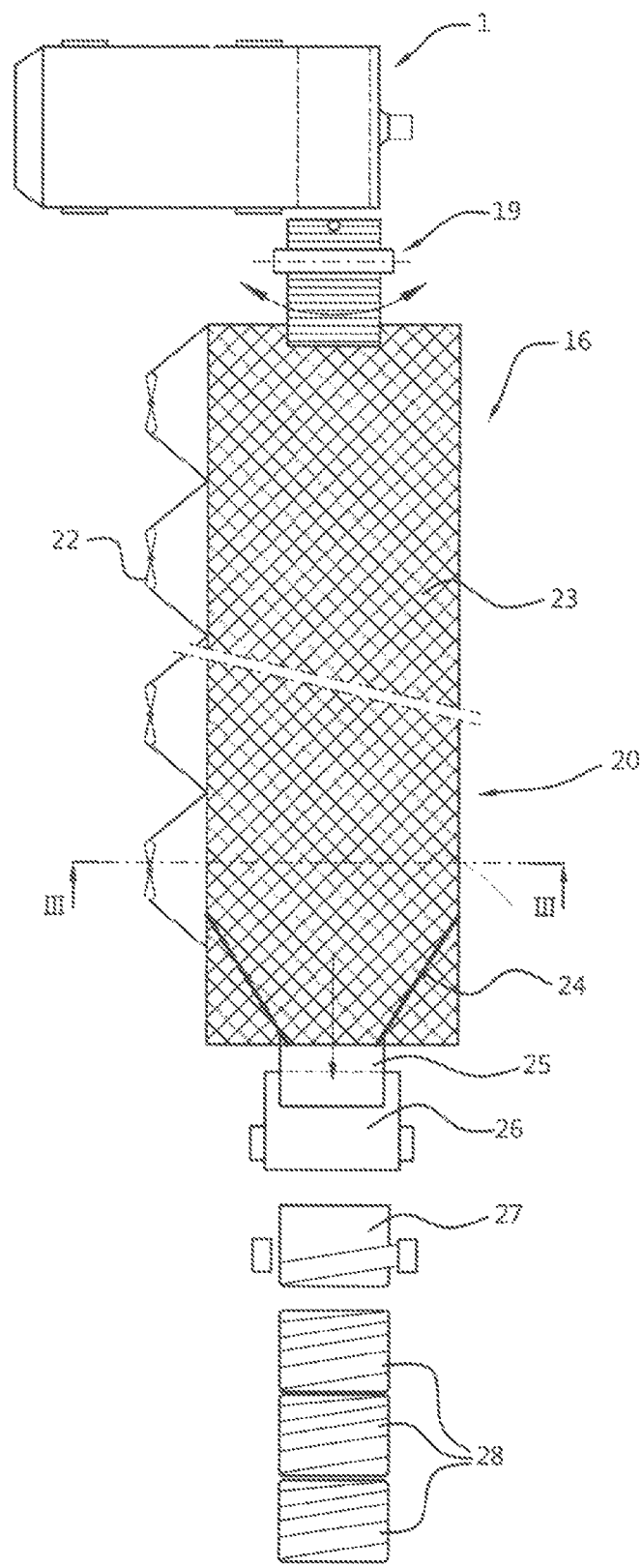
FIG. 3 shows the unmanned device at a stationary crop processing location with crop processing means according to the invention.
Figure 4:
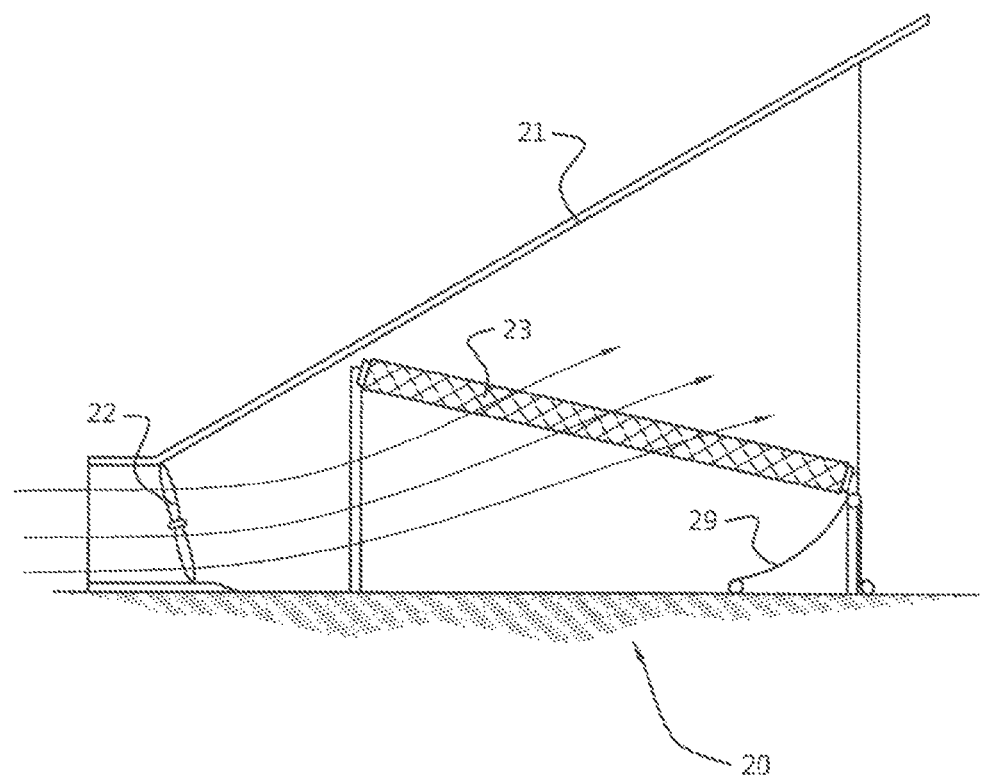
FIG. 4 shows a cross sectional view along the line III-III in FIG. 3.

Now the stationary crop processing location 16 according to the invention will be illustrated in further detail with reference to FIGS. 3 and 4. FIG. 3 shows the unmanned device 1 at a stationary crop processing location 16 with crop processing means according to the invention. FIG. 4 shows a cross sectional view along the line III-III in FIG. 3.

In FIG. 3 the autonomous, unmanned device 1 has arrived at the destination location 11, which in this case is the stationary crop processing location 16. The harvested crop is then automatically unloaded from the storage space 6 by means of the automatic unloading and dosing means, i.e. the side discharge 7 at the rear end of device 1 (see FIG. 1). The side discharge 7 is suitable for unloading the crop at both sides of the device 1.

The crop is unloaded onto a crushing device 19, where the crop is being guided through a roll crusher with two cooperating crushing rolls for crushing the crop. In case the chosen destination location 11 is the crop processing location 16, the step of automatically crushing the harvested feed at the crop processing location 16 is advantageously performed as a first step in order to preserve the harvested crop. The crushing device 19 is arranged to be pivotable around a substantially vertical axis, so that the crushed crop can be easily deposited onto a next processing device.

In FIG. 3 this is a drying station 20. The step of automatically drying the harvested feed at the crop processing location 16 is a highly effective and essential step in preserving the harvested crop. The drying station 20 comprises (see also FIG. 4) a housing with a roof 21, an air inlet and an air outlet (in FIG. 4 on the left side and on the right side, respectively). Ventilator means 22 are provided at the air inlet. A crop drying surface 23 comprises a slowly moveable conveyor belt suitable for receiving on its upper surface a complete batch of crop unloaded by device 1 at the crop processing location 16. It is permeable to air, so as to improve the drying action. The belt surface is not completely horizontal. As can be seen in FIG. 4, the conveyor belt 23 is arranged in a position tilted around an axis parallel to its direction of movement, so as to further improve the drying action.

Advantageously, after the drying step the additional step of compressing and wrapping the harvested feed is performed. In this way, the preservation of the harvested crop is efficiently achieved. To this end, at the end of the crop drying conveyor belt 23 crop guiding means 24 are provided to guide the dried crop to a next processing device, possibly with the aid of a further conveyor belt 25.

In FIG. 3 this is a compressing device 26, preferably followed by a wrapping device 27. The resulting bales 28 are ready for use or for storage.

The arrows in FIG. 4 illustrate how the air passes through the drying station 20. Air guiding means 29 may be provided to optimize the air flow for a good drying action.

Preferably, the crop drying surface 23 is provided with weighing means (known as such, not shown). In this way, during the drying step the dry matter content of the crop can be determined and monitored in order to define the optimal transition from the drying step to the compressing and wrapping step. The dry matter content may e.g. be measured or estimated. Its value is then monitored (e.g. compared to an optimum value) and used to determine the right moment to stop the drying step and to start the following step in which the feed is being compressed and wrapped. In this way it is achieved that the preserved feed has the optimal dry matter content. For example, a weight reduction of 50% for the crop corresponds to a dry matter content of 35% for the dried crop, which is an optimum value for a wrapped bale 28 of dried grass, which is to be preserved until, for example, the next winter.

Of course, the end value of the dry matter content depends on the duration of the drying process (which can be longer per batch of crop in case there is not a great amount of crop to be processed) and on the relative air humidity (a high relative air humidity slows down the drying process, so that the dried crop may have a somewhat higher humidity and thus a somewhat lower dry matter content end value).

In an alternative embodiment, a sensor (not shown) on the device 1 is used for determining the dry matter content of the harvested crop. In this way, the dry matter content can be determined even more accurately.

In an embodiment not shown, furthermore means are provided for preheating air at or near the air inlet. Thus, an improved drying action is achieved.

The housing surface (e.g. the roof 21) and the surface at and/or near the air inlet are preferably black (or of some other dark colour) in order to achieve an optimal heat conversion from the sunlight. This further enhances the efficiency of the system.

Furthermore, means (not shown) are provided for determining the relative air humidity at or near the air inlet and/or at or near the air outlet. This is advantageous in that the relative air humidity is a significant parameter in the drying process.

Advantageously, means are provided for controlling the ventilator means 22 in dependence on the determined relative air humidity at or near the air inlet and at or near the air outlet. For example, the rotation speed and/or the runtime may be optimised. In this way, the efficiency of the system is further improved.

In yet a further embodiment, in case the chosen destination location 11 is a crop processing location 16, the additional step of refining the harvested feed at the crop processing location 16 is performed. Instead of preserving the harvested feed crop at the crop processing location 16, there is an alternative way of processing it: refining the crop. In a manner known as such, a juice can be pressed out of the crop, which can be separated into different fractions in order to extract, for example, protein. This constitutes a highly useful alternative way of processing the freshly harvested feed crop.

Still another alternative way of processing the harvested crop would be shredding or chopping it with appropriate means (known as such, not shown), for example for composting purposes.

Figure 5:
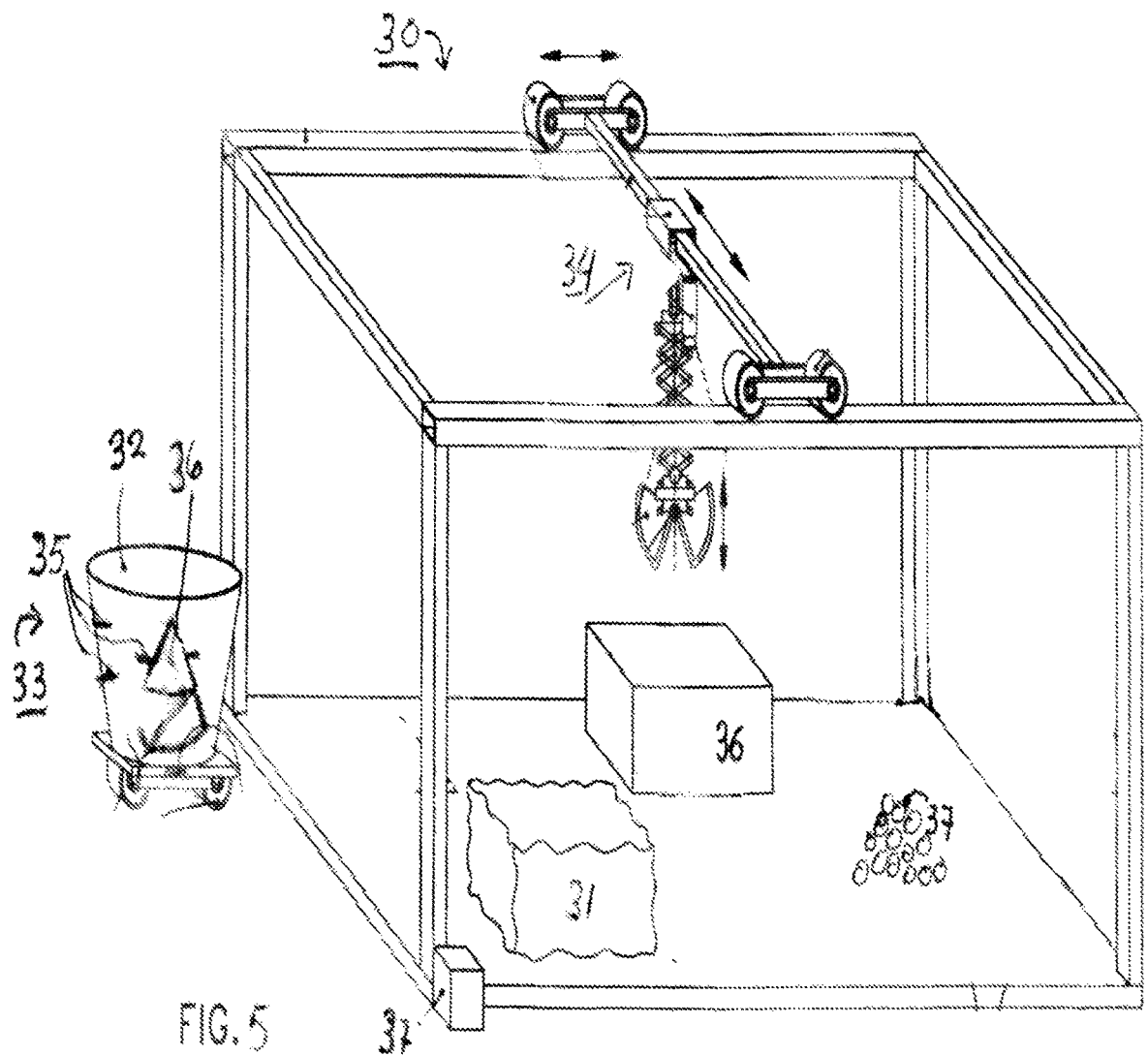
FIG. 5 shows a feed kitchen with a grabber for filling a feed mixer with feed crop.

FIG. 5 shows a destinations location which is a processing location in the form of a feed kitchen 30. Harvested crop feed is automatically dosed in a container 32 of a feed mixer 33 and preferably an additional cutting action is performed. In the feed kitchen 30 the harvested crop feed is stored in a heap 31 together with other types of feed. A movable grabber 34 picks an amount of crop feed from the heap 31 and drops it in the container of a movable feed mixer 33. Knives 35 attached on the screw 36 and knives attached at the wall of the container 32 cut the crop feed into smaller pieces during rotating of the screw 36.

Automatically other types of feed 36, 37 are added in the container 32 and the types of feed 31, 36, 37 are mixed together. These other types of feed like ensilaged maize 36 or potatoes 37 are stored in the feed kitchen 30 and picked up by the grabber 34 and dropped together with the harvested feed 31 in the container 32 of the autonomously movable feed mixer 33. A central control unit 38 controls the movement of the grabber 34 and let the grabber 34 fill the container 32 with preset amounts of different types of feed 31, 36, 37 according to a specific recipe. After filling and mixing, the feed mixer 33 drives autonomously to the stable 12 and doses the feed in front of the feed fence 15.

All these embodiments illustrate that the inventive method and system are highly versatile, as they are responsive and adaptive to the specific circumstances, e.g. with regard to the current feed demand at the feeding location 15. The field of application of the device 1 is thus considerably extended. It can now be used also if there is no direct feed demand at the feeding location 15.

It is also noted that the method avoids any contact of the harvested crop with the soil, which has great advantages over the known methods in which mowing, tedding, raking, and loading the crop results in considerable pollution of and damage to said crop.

The invention claimed is:

1. An agricultural method, using an autonomous, unmanned device and a control device, comprising the following steps, which are performed both sequentially and repeatedly:
   a) automatically harvesting feed crop in a part of a crop field by the autonomous, unmanned device;
   b) automatically loading the harvested feed crop directly into a storage space provided on the autonomous, unmanned device without said harvested feed crop contacting soil;
   c) choosing a destination location from a feeding location and a stationary crop processing location;
   d) automatically transporting the harvested feed crop from the crop field to the chosen destination location by the autonomous, unmanned device; and
   e) automatically unloading the harvested feed crop from the storage space of the autonomous, unmanned device at the chosen destination location.

2. The method according to claim 1, wherein in case the chosen destination location is the crop processing location, the method further comprises a step of automatically dosing the harvested feed crop in a container of a feed mixer.

3. The method according to claim 2, further comprising steps of automatically adding other types of feed in the container and mixing the types of feed.

4. The method according to claim 1, wherein in case the chosen destination location is the crop processing location, the method further comprises a step of automatically crushing the harvested feed crop at the crop processing location.

5. The method according to claim 4, wherein in case the chosen destination location is the crop processing location, the method further comprises a step of automatically drying the harvested feed crop at the crop processing location.

6. The method according to claim 1, wherein in case the chosen destination location is the crop processing location, the method further comprises a step of automatically drying the harvested feed crop at the crop processing location.

7. The method according to claim 6, wherein after the drying step, the method further comprises a step of compressing and wrapping the harvested feed crop.

8. The method according to claim 7, wherein during the drying step, dry matter content of the harvested feed crop is determined and monitored in order to determine an optimal transition from the drying step to the compressing and wrapping step.

9. The method according to claim 1, wherein after the harvesting step, the method further comprises a step of automatically fertilizing said part of the crop field using the autonomous, unmanned device.

10. The method according to claim 1, wherein in step c) the choosing is performed in dependence on a determined feed demand at the feeding location.

11. The method according to claim 1, wherein in step c) the choosing is performed in dependence on a determined quantity of remaining feed crop in the crop field.

12. The method according to claim 1, wherein in step c) the choosing is performed in dependence on a determined quality of the harvested feed crop in the storage space.

13. The method according to claim 1, wherein in case the chosen destination location is the crop processing location, the method further comprises a step of refining the harvested feed crop at the crop processing location.

14. A system for performing the method according to claim 1 using the control device, the autonomous, unmanned device provided with automatic driving comprising a plurality of wheels, a navigator, an automatic feed crop harvester, an automatic feed crop loader, the feed crop storage space, and an automatic feed crop unloader, an automatic energy charging station for the autonomous, unmanned device, the feeding location and the stationary crop processing location with feed crop processor.

15. The system according to claim 14, wherein the crop processor comprises a drying station provided with a housing having an air inlet and an air outlet, a ventilator, and a crop drying surface provided with a scale.

16. The system according to claim 15, further comprising a heater for preheating air at or near the air inlet.

17. The system according to claim 15, wherein a surface of the housing and a surface at and/or near the air inlet are of a dark color in order to achieve an optimal heat conversion from sunlight.

18. The system according to claim 15, further comprising a hygrometer for determining a relative air humidity at or near the air inlet and/or at or near the air outlet.

19. The system according to claim 18, further comprising a controller for controlling the ventilator in dependence on the determined relative air humidity at or near the air inlet and/or at or near the air outlet.

20. The method according to claim 1, wherein in case the chosen destination location is the crop processing location, the method further comprises a step of automatically dosing the harvested feed crop into a container of a feed mixer, and wherein an additional cutting action is performed.

* * * * *